United States Patent [19]
Mori et al.

[11] Patent Number: 5,919,729
[45] Date of Patent: Jul. 6, 1999

[54] THERMOSENSITIVE RECORDING MEDIUM

[75] Inventors: Yasutomo Mori, Numazu; Takeshi Kajikawa, Shizuoka-ken; Mitsunobu Morita, Numazu; Mitsuru Naruse, Shizuoka-ken, all of Japan

[73] Assignee: Ricoh Company, Ltd., Tokyo, Japan

[21] Appl. No.: 08/767,432

[22] Filed: Dec. 16, 1996

[30]     Foreign Application Priority Data

| Dec. 15, 1995 | [JP] | Japan | 7-347907 |
| Mar. 5, 1996 | [JP] | Japan | 8-075163 |
| Mar. 27, 1996 | [JP] | Japan | 8-072226 |

[51] Int. Cl.$^6$ ..................................... B41M 5/40
[52] U.S. Cl. ................... 503/200; 427/152; 503/207; 503/226
[58] Field of Search ..................... 503/200, 226, 503/207; 427/150–152

[56]             References Cited

FOREIGN PATENT DOCUMENTS

| 436390 | 7/1991 | European Pat. Off. . | |
| 2 689 814 | 10/1993 | France . | |
| 2-92582 | 4/1990 | Japan | 503/226 |
| 5-318926 | 12/1993 | Japan | 503/226 |
| 7-137442 | 5/1995 | Japan | 503/226 |
| 7-164742 | 6/1995 | Japan | 503/226 |

*Primary Examiner*—Bruce H. Hess
*Attorney, Agent, or Firm*—Oblon, Spivak, McClelland, Maier & Neustadt, P.C.

[57]             ABSTRACT

A thermosensitive recording medium having a support, a thermosensitive layer provided on the support and capable of forming a color image when heated imagewise, and a protecting layer provided on the thermosensitive layer and containing a pigment and a core-shell resin obtained by polymerizing a vinyl monomer in an emulsion containing acrylonitrile-containing polymer seeds such that a polymer of the vinyl monomer is copolymerized on each of the seeds to form a shell surrounding a core of the seed, wherein the core-shell resin meets with at least one of the following criteria (a) and (b):

(a) the glass transition point Tg of the core is at least 15° C.; and (b) the glass transition point Tg of the shell is at least 150° C. The vinyl monomer contains acrylamide and/or methacrylamide.

13 Claims, No Drawings

THERMOSENSITIVE RECORDING MEDIUM

BACKGROUND OF THE INVENTION

This invention relates to a thermosensitive recording medium and, more specifically, to an improved thermosensitive recording medium having a support and a thermosensitive coloring layer formed thereon and capable of forming a color image when heated imagewise.

Generally, a thermosensitive recording medium prepared by forming on a support, such as a sheet of paper or a film, a thermosensitive coloring layer which includes as the main component a thermosensitive coloring composition is capable of producing a colored image by heating with a thermal head, thermal pen, laser beam or stroboscopic lamp. This type of recording material is advantageous over other conventional recording materials because the recording can be speedily achieved by a simple process with a relatively compact device. Noise development and environmental problems can be minimized, and the manufacturing cost of the recording material is low. Owing to the above-mentioned advantages, the thermosensitive recording medium is utilized in a wide number of fields such as facsimile machines, electronic computer terminals, recorders and automatic vending machines for labels and tickets.

The thermosensitive coloring composition for use in such a thermosensitive recording medium includes a coloring agent and a color developer capable of inducing color formation in the coloring agent upon application of heat thereto. Specifically, a colorless to light colored leuco dye with a lactone or lactam, or a spiroyran ring is employed as the coloring agent. An organic acid or phenolic material is conventionally used as the color developer. The recording medium employing the combination of the above-mentioned coloring agent and color developer is capable of producing images with clear tone, while maintaining a high degree of whiteness of the background. In addition, the weather-resistance of the obtained images is superior.

However, the thermosensitive recording medium has the shortcomings that the recording images easily fade when brought into contact with water or plasticizers such as dioctyl adipate (DOA) and dioctyl phthalate (DOP), and that the background of the recording medium is easily colored when brought into contact with oil, or solvents such as ethanol and ethyl acetate. The reliability of the images recorded on the thermosensitive recording medium is not satisfactory.

To solve the aforementioned reliability problem, the provision of a protective layer on the thermosensitive coloring layer has been proposed in, for example, Japanese Published Unexamined Patent Applications Nos. 54-128347 and 53-3594. In addition, it is disclosed in Japanese Published Unexamined Patent Applications Nos. 56-126193 and 56-13993 that the protective layers including water-soluble resins, for example, vinyl alcohol or modified materials thereof, and starch or modified materials thereof are effective in improving resistance to oil and plasticizer of the obtained thermosensitive recording medium.

However, the water resistance of such a protective layer including the water-soluble resin is poor so that the protective layer is easily peeled off when brought into contact with water. To improve the water resistance, the protective layer is often prepared by curing with a crosslinking agent as is outlined in Japanese Published Unexamined Patent Applications Nos. 57-188392. Various combinations of the water-soluble resin and the crosslinking agent are conventionally proposed.

For example, the combination of polyvinyl alcohol and an epoxy compound with two or more epoxy groups or an ethylene-imine compound with two or more ethylene-imine groups is proposed in Japanese Published Unexamined Patent Application No. 60-68990. The combination of casein and a compound having a methylol group has been proposed in Japanese Published Unexamined Patent Application No. 60-193693. The combination of a copolymer of acrylamide-crylonitrile—a carboxyl group-containing vinyl compound and an epoxy resin is proposed in Japanese Published Unexamined Patent Application No. 61-37467. The combination of polyvinyl alcohol and a 2,4-dihydroxy-1,4-dioxane derivative is proposed. in Japanese Published Unexamined Patent 10 Application No. 62-44494. Japanese Published Unexamined Patent Application No. 62-270382 discloses the use of bis(4-glycidyloxyphenyl)sulfone as a crosslinking agent. Japanese Published Unexamined Patent Applications Nos. 5-318926 and 7-164742 suggest the use of a core-shell resin for the formation of a protecting layer. The known techniques, however, are not fully satisfactory. In particular, with the known protecting layer, it is not possible to simultaneously satisfy the demands for good resistance to water, plasticizers and heat, for maintenance of the sensitivity of the thermosensitive coloring layer and for prevention of deposition of scales on a thermal head.

SUMMARY OF THE INVENTION

It is, therefore, an object of the present invention to provide a thermosensitive recording medium which has excellent resistance to plasticizers, heat and water, which can afford stable images having a high image density and which can prevent the deposition of scales on a thermal head during recording.

In accomplishing the foregoing object, there is provided in accordance with the present invention a thermosensitive recording medium comprising a support, a thermosensitive layer provided on said support and capable of forming a color image when heated imagewise, and a protecting layer provided on said thermosensitive layer and containing a pigment and a core-shell resin obtained by polymerizing a vinyl monomer in an emulsion containing acrylonitrile-containing polymer seeds so that a polymer of said vinyl monomer is copolymerized on each of said seeds to form a shell surrounding a core of said seed, said vinyl monomer containing acrylamide and/or methacrylamide, wherein said core-shell resin meets with at least one of the following criteria (a) and (b):

(a) the glass transition point Tg of said core is at least 15° C.; and (b) the glass transition point Tg of said shell is at least 150° C.

In another aspect, the present invention provides a thermosensitive recording medium comprising a support, a thermosensitive-layer provided on one side of said support and capable of forming a color image when heated imagewise, and an undercoat layer provided on the other side of said thermosensitive layer and containing a pigment and a core-shell resin obtained by polymerizing a vinyl monomer in an emulsion containing acrylonitrile-containing polymer seeds so that a polymer of said vinyl monomer is copolymerized on each of said seeds to form a shell surrounding a core of said seed, said vinyl monomer containing acrylamide and/or methacrylamide, wherein said core-shell resin meets with at least one of the following criteria (a) and (b):

(a) the glass transition point Tg of said core is at least 15° C., and (b) the glass transition point Tg of said shell is at least 150° C.

Other objects, features and advantages of the present invention will become apparent from the detailed description of the preferred embodiments to follow.

DETAILED DESCRIPTION OF THE PREFERRED EMBODIMENTS OF THE INVENTION

The thermosensitive recording medium according to the present invention has a surface protecting or backcoat layer containing a core-shell resin. The core-shell resin may be obtained by a method including a step of polymerizing a vinyl monomer in an emulsion containing acrylonitrile-containing polymer particles. The vinyl monomer includes acrylamide, methacrylamide or a mixture thereof. As a result of the polymerization of the vinyl monomer, a polymer of the vinyl monomer is copolymerized on the surface of the acrylonitrile-containing polymer particle to form a composite structure in which a layer or a shell of the polymerized vinyl monomer surrounds a core of the acrylonitrile-containing polymer. Thus, the acrylonitrile-containing polymer particles are used as the seeds for the formation of the core-shell resin.

The acrylonitrile-containing polymer which forms a core of the core-shell resin may be polyacrylonitrile or a copolymer of acrylonitrile with a copolymerizable monomer such as a vinyl monomer, e.g. acrylic acid or methacrylic acid. The content of acrylonitrile in the acrylonitrile-containing polymer (i.e. in the core) is preferably 5–95% by weight.

The vinyl monomer which forms, upon copolymerization on the acrylonitrile-containing polymer core, a shell of the core-shell resin should contain acrylamide, methacrylamide or a mixture thereof. If desired, other vinyl monomer such as acrylic acid or methacrylic acid may be additionally used. The content of the acrylamide and/or methacrylamide in the shell is preferably at least 5% by weight.

It is important that at least one of the following conditions (a) and (b) should be met: (a) the glass transition point Tg of the acrylonitrile-containing polymer constituting the core is at least 15° C. and (b) the glass transition point Tg of the polymer constituting the shell is at least 150° C., in order to obtain high resistance to plasticizer and high image density. The Tg of the shell and the core can be adjusted by the composition of the polymers thereof. Tg herein is as measured by the DSC method in accordance with Japanese Industrial Standard JIS K7121.

The weight ratio of the core to the shell is preferably 1:10 to 10:1, more preferably 3:10 to 10:13.

The copolymerization of the vinyl monomer in an emulsion containing acrylonitrile-containing polymer particles may be carried out in a conventional manner.

Generally, an aqueous emulsion containing acrylonitrile-containing polymer particles is placed in a reactor, to which a vinyl monomer is gradually added with stirring at a room temperature or an elevated temperature. In one preferred embodiment, the core-shell resin emulsion is produced by a two step method in which, in the first step, acrylonitrile (and optionally a comonomer) is polymerized in an emulsified state to form seeds and, in the second step, a vinyl monomer is added to the emulsion obtained in the first step and copolymerized.

It is preferred that the polymerization of the vinyl monomer be performed in the presence of a protective colloid of a water-soluble resin. The water-soluble resin may be, for example, a natural resin such as sodium alginate, starch, casein or cellulose and a synthetic resin such as polyvinyl alcohol, polycarboxylic acid, polyacrylamide or derivatives thereof. The term "derivative" used herein is intended to refer to polyvinyl alcohol, polycarboxylic acid or polyacrylamide to which another copolymerizable monomer is copolymerized, graft-copolymerized or bonded as a pendant. group.

Illustrative of suitable polyvinyl alcohol (PVA) derivatives are carboxyl-modified PVA, epoxy group-modified PVA, silanol group-modified PVA, acetoacetyl group-modified PVA, acrylamide-modified PVA, butylal-modified PVA-maleic acid copolymer, N-methylolurethanated PVA, amino group-modified PVA and completely saponified PVA. The use of epoxy group-modified PVA is particularly preferred.

Illustrative of suitable polycarboxylic acid derivatives are styrene-acrylic acid copolymer, acrylic ester-acrylic acid copolymer, styrene-acrylic ester-acrylic acid terpolymer, styrene-maleic acid copolymer, isobutylene-maleic anhydride copolymer, styrene-acrylamide copolymer and styrene-acrylic acid-acrylamide terpolymer. The use of isobutylene-maleic anhydride copolymer or a derivative thereof, or styrene-acrylamide copolymer is particularly preferred.

As the protective colloid, an aqueous emulsion such as polyethyleneimine, polyester, polyurethane, acrylic ester copolymer, epoxy resin, polyvinyl acetate, polyvinylidene chloride, polyvinyl chloride or derivatives thereof may also be used.

It is preferred that the core-shell resin be crosslinked using a crosslinking agent such as an aziridine compound, a glycidyl compound, an epichlorohydrin compound, a glyoxal compound, a methylol group-containing compound, boric acid or a carbodiimide compound. The carbodiimide compound is preferably a compound of the formula:

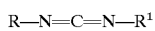

wherein R and $R^1$ stand, independently from each other, for a substituted or non-substituted alkyl or aryl group. The surface protecting layer and/or backcoat layer containing a crosslinked core-shell resin exhibits excellent resistance to water, plasticizers and heat. The crosslinking may be suitably carried out at the time of the formation of the protecting or backcoat layer. The crosslinking mainly occurs in the polymer constituting the shell.

The surface protecting layer and/or backcoat layer contains a pigment. The pigment may be an inorganic pigment such as silica, calcium silicate, magnesium silicate, aluminum silicate, zinc silicate, zinc oxide, calcium carbonate, barium sulfate, titanium oxide, lithopone, talc, kaolin, aluminum hydroxide, calcined kaolin or phrophylite and an organic pigment such as a urea formalin resin or polyethylene powder. The pigment is generally used in an amount providing a weight ratio of the pigment to the core-shell resin of 1 or less. The pigment preferably has an average particle diameter of 3 μm or less and an oil absorbing capacity (in accordance with Japanese Industrial Standard JIS K-5101) of 250 cc/100 g or less.

The surface protecting layer may further contain an ordinary additive such as a filler, a surfactant, a UV absorbing agent, a lubricant or an agent for preventing coloring of the thermosensitive medium by pressure. Illustrative of suitable lubricants (preferably heat fusible materials having a melting point of 50–200° C.) are higher fatty acids or esters, amides or metal salts thereof (e.g. zinc stearate, calcium stearate and aluminum stearate), waxes (e.g. polyethylene wax, paraffin wax and microcrystalline wax), aromatic carboxylic acid-amine condensation products, fatty amides, phenyl benzoate, higher ketone and p-benzylbiphenyl.

The thermosensitive color-developing layer of the thermosensitive recording medium according to the present invention contains one or more leuco dyes such as triphenylmethane leuco compounds, fluoran leuco compounds, phenothiazine leuco compounds, auramine leuco compounds, spiropyran leuco compounds and indolinophthalide leuco compounds. Examples of such leuco compounds include:

3-bis[2,2-bis(4-pyrrolidinophenyl)-ethenyl]-5,6-dichloro-4,7-dibromophthalide,
3-dimethylamino-6-dimethylaminofluorene-9-spiro-3'-(6'-dimethylamino)phthalide,
3-(2'-methoxy-5'-methylphenyl)phthalide,
3-(2'-hydroxy-4'-dimethylaminophenyl)-3-(2'-methoxy-5'-chlorophenyl)phthalide,
3-(2'-hydroxy-4'-dimethylaminophenyl)-3-(2'-methoxy-5'-nitrophenyl)phthalide, 3-(2'-methoxy-4'-dimethylaminophenyl)-3-(2'-hydroxy-4'-chloro-5'-methylphenyl)phthalide,
3-(p-dimethylaminophenyl)-3-[2,2-bis(p-dimethylaminophenyl)ethenyl]phthalide,
3-(p-dimethylaminophenyl)-3-[2,2-bis(p-dimethylaminophenyl)-ethenyl]-6-dimethylaminophthalide,
3-(p-dimethylaminophenyl)-3-(2-p-dimethylaminophenyl-2-phenyletheyl)phthalide,
3-(p-dimethylaminophenyl)-3-(2-p-dimethylaminophenyl-2-p-chlorophenylethenyl)-6-dimethylaminophthalide,
3-(4'-dimethylamino-2'-methoxyphenyl)-3-(4"-p-dimethylaminophenyl-4"-p-chlorophenyl-1",3"-butadienyl)-5,6-benzophthalide,
3-(4'-dimethylamino-2'-benzyloxyphenyl)-3-(4"-p-dimethylaminophenyl-4"-phenyl-1", 3"-butadienyl)-5,6-benzophthalide,
3,3-bis(p-dimethylaminophenyl)phthalide,
3,3-bis(p-dimethylaminophenyl)-6-dimethylaminophthalide (or Crystal Violet Lactone),
3,3-bis(p-dimethylaminophenyl)-6-diethylaminophthalide,
3,3-bis(p-dimethylaminophenyl)-6-chlorophthalide,
3,3-bis(p-dibutylaminophenyl)phthalide,
3,3-bis[2-(p-dimethylaminophenyl)-2-(p-methoxyphenyl) ethenyl]-4,5,6,7-tetrachlorophthalide,
3,6-bis(dimethylamino)-fluorenespiro(9',3')-6'-dimethylaminophthalide, benzoleuco methylene blue,
2-chloro-3-N-methyl-N-o-methylphenylamino-7-(p-n-butylanilino)fluoran,
2-chloro-3-N-methyl-N-m-methylphenylamino-7-(p-n-butylanilino)fluoran,
2-chloro-3-N-methyl-N-p-methylphenylamino-7-(p-n-butylanilino)fluoran,
2-N-m-trifluoromethylphenylamino-6-diethylaminofluoran,
3-cyclohexylamino-6-chlorofluoran,
3-dibutylamino-6-methyl-7-anilinofluoran,
3-dibutylamino-7-(o-chloroanilino)fluoran,
3-diethylamino-7-chlorofluoran,
3-diethylamino-7-methylfluoran,
3-diethylamino-7,8-benzfluoran,
3-diethylamino-6-methyl-7-chlorofluoran,
3-diethylamino-6-methyl-7-(m-trichloromethylanilino)fluoran,
3-diethylamino-7-(o-chloroanilino)fluoran,
3-diethylamino-6-chloro-7-anilinofluoran,
3-diethylamino-6-methyl-7-anilinofluoran,
3-diethylamino-6-methyl-7-(2',4'-dimethylanilino)fluoran,
3-diethylamino-5-methyl-7-dibenzylaminofluoran,
3-diethylamino-5-chloro-7-(N-benzyl-N-trifluoromethylphenylamino)fluoran,
3-diethylamino-5-chloro-7-(α-phenylethylamino)fluoran,
3-diethylamino-7-(o-methoxycarbonylphenylamino)fluoran,
3-diethylamino-5-methyl-7-(α-phenylethylamino)fluoran,
3-diethylamino-7-piperidinofluoran,
3-diethylamino-6-methyl-7-mesidino-4',5'-benzofluoran,
3-dimethylamino-5,7-dimethylfluoran,
3-dipentylamino-6-methyl-7-anilinofluoran,
3-N-benzyl-N-cyclohexylamino-5,6-benzo-7-α-naphthylamino-4'-bromofluoran,
3-N-ethyl-N-isoamyl-6-methyl-7-anilinofluoran,
3-N-ethyl-N-tetrafurfurylamino-6-methyl-7-anilinofluoran,
3-N-ethyl-N-p-methylphenylamino-7-(α-phenylethylamino)fluoran,
3-N-ethyl-N-2-ethoxypropylamino-6-methyl-7-anilinofluoran,
3-N-ethyl-N-tetrafydrofurfurylamino-6-methyl-7-anilinofluoran,
3-N-ethyl-N-isobutyl-6-methyl-7-anilinofluoran,
3-N-methyl-N-amylamino-6-methyl-7-anilinofluoran,
3-N-methyl-N-cyclohexylamino-6-methyl-7-anilinofluoran,
3-N-methyl-N-isoamylamino-6-methyl-7-anilinofluoran,
3-N-methyl-N-isobutyl-6-methyl-7-anilinofluoran,
3-N-methyl-N-isobutylamino-6-methyl-7-anilinofluoran,
3-N-methyl-N-isopropylamino-6-methyl-7-anilinofluoran,
3-N-p-tolyl-N-ethylamino-6-methyl-7-anilinofluoran,
3-morpholino-7-(N-propyl-N-o-trifluoromethylphenylamino)fluoran,
3-morpholino-7-(N-propyl-N-m-trifluoromethylphenylamino)fluoran,
3-morpholino-7-(N-propyl-N-p-trifluoromethylphenylamino)fluoran,
3-pyrrolidino-6-methyl-7-anilinofluoran,
3-pyrrolidino-7-o-trifluoromethylanilinofluoran,
3-pyrrolidino-7-m-trifluoromethylanilinofluoran,
3-pyrrolidino-7-p-trifluoromethylanilinofluoran,
3-pyrrolidino-7-(di-p-chlorophenyl)methylaminofluoran,
3-(2'-hydroxy-4'-diethylaminophenyl)-3-diethylamino-6-methyl-7-(2',4'-dimethylanilino)fluoran,
2-[3,6-bis(diethylamino)-9-(o-chloroanilino)-xanthylbenzoic acid lactam],
6-chloro-8-methoxy-2,3-dihydrobenzoindole-2-spiro-2'-(2', 3'-dihydro-benzofuran),
6-bromo-8-methoxy-2,3-dihydrobenzoindole-2-spiro-2'-(2', 3'-dihydrobenzofuran),
bis(p-dimethyl-aminostyryl)-1-naphthalenesulfonylmethane,
bis (p-dimethyl-aminostyryl)-1-p-tolylsulfonylmethane.

Any developer customarily used in the field of thermosensitive recording material may be suitably used for the purpose of the present invention. The developer may be selected from various electron acceptors, for example, phenolic compounds, thiophenolic compounds, thiourea compounds, organic acids and metallic salts thereof, which are capable of inducing color formation in the aforementioned leuco dye. Examples of suitable developers include:
4,4'-isopropylidenediphenol,
4,4'-isopropylidenebis(o-methylphenol),
4,4'-s-butylidenediphenol,
4,4'-isopropylidenebis(2-t-butylphenol),
4,4'-cyclohexylidenediphenol,
4,4'-isopropylidenebis(2-chlorophenol),
2,2'-methylenebis(4-methyl-6-t-butylphenol), 2,2'-methylenebis(4-ethyl-6-t-butylphenol),
4,4'-butylidenebis(2-methyl-6-t-butylphenol),
1,1,3-tris(2-methyl-4-hydroxy-5-t-butylphenyl)butane,
1,1,3-tris(2-methyl-4-hydroxy-5-cyclohexylphenyl)butane,
zinc p-nitrobenzoate,
1,3,5-tris(4-t-butyl-3-hydroxy-2,6-dimethylbenzyl) isocyanuric acid,
2,2-(3',4'-dihydroxyphenyl)propane,
bis(4-hydroxy-3-methylphenyl)sulfide,
4-[β-(p-methoxyphenoxy)ethoxy]salicylic acid,
1,7-bis(4-hydroxyphenylthio)-3,5-dioxaheptane,
1,5-bis(4-hydroxyphenylthio)-5-oxapentane,
monocalcium monobenzylphthalate,
4,4'-cyclohexylidenediphenol,
4,4'-isopropylidenebis(2-chlorophenol),
2,2'-methylenebis(4-methyl-6-tert-butylphenol),
2,2'-methylenebis(4-ethyl-6-tert-butylphenol),
4,4'-butylidenebis(6-tert-butyl-2-methylphenol),
4,4'-thiobis(6-tert-butyl-2-methylphenol),
4,4'-diphenolsulfone,
4-isopropoxy-4'-hydroxydiphenylsulfone,
4-benzyloxy-4'-hydroxydiphenylsulfone,
4,4'-diphenolsulfoxide,
isopropyl p-hydroxybenzoate,
benzyl p-hydroxybenzoate,
benzyl protocatechuate,
stearyl gallate,
lauryl gallate,
octyl gallate,
1,7-bis(4-hydroxyphenylthio)-3,5-dioxaheptane,
1,5-bis(4-hydroxyphenylthio)-3-oxapentane,
1,3-bis(4-hydroxyphenylthio)propane,
N,N'-diphenylthiourea,
N,N'-di(m-chlorophenyl)thiourea,
salicylanilide,
5-chloro-salicylanilide,
2'-hydroxy-3-naphthoic acid,
2-hydroxy-1-naphthoic acid,
metal salts (e.g. zinc, aluminum and calcium salts) of hydroxynaphthoic acids,
methyl bis(4-hydroxyphenyl)acetate,
benzyl bis(4-hydroxyphenyl)acetate,
2,4'-diphenolsulfone,
2,2'-diallyl-4,4'-diphenolsulfone,
3,4-dihydroxyphenyl-4'-methyldiphenylsulfone,
zinc 1-acetyloxy-2-nathoate,
zinc 2-acetyloxy-1-naphthoate,
zinc 2-acetyloxy-3-naphthoate,
α,α-bis(4-hydroxyphenyl)-α-methyltoluene,
3,3'-diallyl-4,4'-diphenolsulfone,
antipyrine complex of zinc thiocyanate,
tetrabromobisphenol A,
tetrabromobisphenol S,
4,4'-thiobis(2-methylphenol) and
4,4'-thiobis(2-chlorophenol).

The above color developers may be used singly or in combination of two or more thereof.

The thermosensitive color-developing layer may contain a binder to firmly bond the layer to the support. Any binder conventionally used in the field of the thermosensitive recording medium may be employed for the purpose of the present invention. Illustrative of suitable binders are:

water-soluble polymers such as polyvinyl alcohol, carboxyl group-modified polyvinyl alcohol, starch, starch derivatives, hydroxyethylcellulose, hydroxymethylcellulose, ethylcellulose, methylcellulose, carboxymethylcellulose, sodium polyacrylate, polyvinyl pyrrolidone, an acrylamide-acrylate copolymer, an acrylamide-acrylate-methacrylic acid terpolymer, a salt of a styrene-maleic anhydride copolymer, a salt of a styrene-acrylic acid copolymer, a salt of isobutylene-maleic anhydride copolymer, polyacrylamide, sodium alginate, gelatin and casein; and latex such as a styrene-butadiene copolymer or a styrene-butadiene-acrylic acid (or acrylate) copolymer, emulsions such as polyvinyl acetate, a vinyl acetate-acrylic acid copolymer, a styrene-acrylate copolymer, polyacrylic acid, polyurethane, polyacrylate, polybutyl methacrylate, polymethacrylate, a vinylchloride-vinyl acetate copolymer and an ethylene-vinyl acetate copolymer.

The photosensitive color-developing layer of the present invention may also contain auxiliary additive components such as a filler, a surfactant, a lubricant and an agent for preventing color formation by pressure. These additives may be the same as those used in the above-described protecting layer.

Any conventionally used support, such as paper, a plastic film or a synthetic paper, may be suitably used for the purpose of the present invention.

In the present invention, an undercoat layer may be interposed between the support and the thermosensitive recording layer. It is preferable that the undercoat layer for use in the present invention comprise the same resin component and the same crosslinking agent as used in the protecting layer. A backcoat layer may be provided on the back side of the support, opposite to the thermosensitive color-developing layer with respect to the support, as desired. It is preferable that the backcoat layer for use in the present invention comprise the same resin component and the same crosslinking agent as used in the protecting layer. Owing to the provision of the undercoat layer or backcoat layer, penetration of water and chemicals from the back side of the support to the thermosensitive layer can be effectively prevented, thereby improving the resistance to water and chemicals of the recording medium. Further, a plurality of protecting layers for use in the present invention may be provided on the thermosensitive layer, if desired.

The thermosensitive recording medium according to the present invention can be employed in various fields such as labels and magnetic tickets. In the case of a label, the thermosensitive color-developing layer and the protecting layer are successively formed on the front side of a support and an adhesive layer is formed on the back side of the support, with a disposable backing sheet attached to the adhesive layer. In the case of a magnetic ticket, a magnetic recording layer containing a ferromagnetic substance and a binder is substituted for the above-mentioned disposable backing sheet.

The following examples will further illustrate the present invention. Parts and percentages are by weight.

EXAMPLES 1–28

Formation of Thermosensitive Color-developing Layer:

A mixture of the following components was independently pulverized and dispersed with a sand grinder for 2–4 hours, so that Liquid A and Liquid B were prepared:

Liquid A:

| | |
|---|---|
| 3-(N-Methyl-N-cyclohexyl)amino-6-methyl-7-anilinofluoran | 10 parts |
| 10% Aqueous polyvinyl alcohol solution | 10 parts |
| Water | 80 parts |
| Liquid B: | |
| 4-Hydroxyphenyl-4'-isopropoxyphenyl sulfone | 10 parts |
| Calcium carbonate | 10 parts |
| 1,1,3-tris(2-methyl-4-hydroxy-5-cyclohexylphenyl)butane | 5 parts |
| 10% Aqueous polyvinyl alcohol solution | 20 parts |
| Water | 55 parts |

Each of Liquid A and Liquid B was further dispersed with a sand mill for 24 hours and then mixed together with stirring at a weight ratio of 1:3 to obtain a coating liquid.

The coating liquid was coated on a sheet of commercially available high quality paper with a basis weight of 50 g/m² in an amount of 5 g/m² on a dry basis to form a thermosensitive color-developing layer on the paper support. This was used for the preparation of thermosensitive recording media of Examples 1–40.

The following components were mixed to prepare a coating liquid for a protecting layer or a backcoat layer:

| | |
|---|---|
| 20% Dispersion of kaolin (average particle size: 2 μm, oil absorbing capacity: 200 cc/100 g) | 50 parts |
| 20% Dispersion or solution of core-shell resin shown in Table 1-1 | 100 parts |

The above coating liquid was coated on the above prepared thermosensitive color-developing layer (Examples 1–21) or on the back side of the paper support (Examples 22–28) in an amount of 3 g/m² on a dry basis to form a protecting layer or a backcoat layer, thereby obtaining a thermosensitive recording medium.

EXAMPLES 29, 30, 32 and 33

The following components were mixed to prepare a coating liquid for a protecting layer or a backcoat layer:

| | |
|---|---|
| 20% Dispersion of kaolin (average particle size: 2 μm, oil absoring capacity: 200 cc/100 g) | 50 parts |
| 10% Dispersion of curing agent (UCARLMK XL25SE manufactured by Gunze Sangyo K.K.) | 10 parts |
| 20% Dispersion or solution of core-shell resin shown in Table 1-1 | 100 parts |

The above coating liquid was coated on the above prepared thermosensitive color-developing layer in an amount 3 g/m² on a dry basis to form a protecting layer, thereby obtaining a thermosensitive recording medium.

EXAMPLES 34–40

Example 33 was repeated in the same manner as described except that kaolin having an oil absorbing capacity of 100 cc/100 g was used (Example 34), that kaolin having an oil absorbing capacity of 300 cc/100 g was used (Example 35), that kaolin having an average particle size of 1 μm was used (Example 36), that kaolin having an average particle size of 3 μm was used (Example 37), that kaolin was used in an amount of 10 parts (Example 38), that kaolin was used in an amount of 100 parts (Example 39), and that the coating liquid was coated on the back side of the paper support (Example 40), thereby obtaining thermosensitive recording media.

COMPARATIVE EXAMPLE 1

Example 1 was repeated in the same manner as described except that PVA was substituted for the core-shell resin, thereby obtaining a thermosensitive recording medium.

COMPARATIVE EXAMPLE 2

Comparative Example 1 was repeated in the same manner as described except that coating liquid was coated on the back side of the paper support, thereby obtaining a thermosensitive recording medium.

COMPARATIVE EXAMPLE 3

Example 29 was repeated in the same manner as described except that PVA was substituted for the core-shell resin, thereby obtaining a thermosensitive recording medium.

COMPARATIVE EXAMPLE 4

Comparative Example 3 was repeated in the same manner as described except that coating liquid was coated on the back side of the paper support, thereby obtaining a thermosensitive recording medium.

Each of the thus obtained thermosensitive recording media was tested for coloring thermosensitivity, resistance to water, resistance to heat, resistance to plasticizer, and scale deposition according to the following methods. The results are summarized in Tables 1-1, 1-2, 2-1 and 2-2.

Coloring Thermosensitivity

Sample is printed with a printing test device at an electric power of 0.6 W and a pulse width of 1.2 msec. The image density, which represents coloring thermosensitivity, is measured by McBbth densitometer RD-914.

Resistance to Water

After being allowed to stand at 40° C. for 16 hours, sample is immersed in water for another 16 hours. Thereafter, the protecting layer or backcoat layer of sample is rubbed with a finger to check the peelability thereof. The resistance to water is evaluated according to the following ratings:

A: no peel (acceptable)

B: slightly peeled (acceptable)

C: considerably peeled (unacceptable)

Resistance to Heat

Sample after the above Coloring Thermosensitivity test is allowed to stand at 70° C. for one hour, and then the image density of the background is measured by McBeath densitometer. The density of the background before the heat resistance test is 0.07.

Resistance to Plasticizer

Sample is contacted with a heated block to form an image having a density of 1.3 as measured by McBeth densitometer. Dioctyl adipate is applied to the surface of the protecting layer and the resulting sample is allowed to stand at 30° C. for 16 hours. Or, dioctyl adipate is applied to the surface of the backcoat layer and the resulting sample is allowed to stand at 40° C. for 24 hours. The image density, which represents resistance to plasticizer, is thereafter measured by McBeth densitometer.

Scale Deposition

Sample is continuously printed with a printing test device at an electric power of 0.6 W and a pulse width of 1.0 msec through a length of 30 Km. Thereafter, the thermal head is observed to check scale deposition which is rated as follows:

A: No deposition of scales

B: Slight deposition of scales

C: Large amount of deposition of scales

Thermosensitive recording media evaluated as belonging to A and B are acceptable. However, thermosensitive recording media showing the scale deposition of rank C above is ill-suited for practical use.

TABLE 1-1

| Example No. | Core-Shell Resin No.* | Thermosensitivity | Resistance to Water | Resistance to Heat |
|---|---|---|---|---|
| 1** | 1 | 1.25 | B | 0.12 |
| 2** | 2 | 1.30 | B | 0.11 |
| 3** | 3 | 1.35 | B | 0.12 |
| 4 | 4 | 1.24 | B | 0.11 |
| 5 | 5 | 1.31 | B | 0.11 |
| 6 | 6 | 1.34 | B | 0.11 |
| 7 | 7 | 1.26 | B | 0.12 |
| 8 | 8 | 1.28 | B | 0.11 |
| 9 | 9 | 1.34 | B | 0.12 |
| 10** | 10 | 1.26 | B | 0.12 |
| 11** | 11 | 1.28 | B | 0.12 |
| 12** | 12 | 1.34 | B | 0.11 |
| 13 | 13 | 1.26 | B | 0.12 |
| 14 | 14 | 1.29 | B | 0.12 |
| 15 | 15 | 1.34 | B | 0.12 |
| 16 | 16 | 1.30 | B | 0.12 |
| 17 | 17 | 1.34 | B | 0.12 |
| 18 | 18 | 1.34 | B | 0.11 |
| 19 | 19 | 1.30 | B | 0.12 |
| 20 | 20 | 1.34 | B | 0.11 |
| 21 | 21 | 1.36 | B | 0.11 |
| 22** | 3 | — | B | — |
| 23 | 6 | — | B | — |
| 24 | 9 | — | B | — |
| 25** | 12 | — | B | — |
| 26 | 15 | — | B | — |
| 27 | 18 | — | B | — |
| 28 | 21 | — | B | — |

**: Comparative Sample

TABLE 1-2

| Example No. | Core-Shell Resin No.* | Thermosensitivity | Resistance to Water | Resistance to Heat |
|---|---|---|---|---|
| 29** | 3 | 1.33 | A | 0.11 |
| 30 | 6 | 1.31 | A | 0.11 |
| 32 | 18 | 1.30 | A | 0.11 |
| 33 | 21 | 1.35 | A | 0.11 |
| 34 | 21 | 1.34 | A | 0.12 |
| 35 | 21 | 1.36 | A | 0.12 |
| 36 | 21 | 1.35 | A | 0.12 |
| 37 | 21 | 1.30 | A | 0.11 |
| 38 | 21 | 1.37 | A | 0.12 |
| 39 | 21 | 1.36 | A | 0.11 |
| 40 | 21 | — | A | — |
| Comp. 1 | PVA | 1.22 | C | 0.12 |
| Comp. 2 | PVA | — | C | 0.12 |
| Comp. 3 | PVA | 1.32 | C | 0.12 |
| Comp. 4 | PVA | — | C | — |

*: Core-shell resins Nos. 1–21 shown in Tables 1-1 and 1-2 are identified in Table 3. The core is formed of a copolymer of acrylonitrile and butyl acrylate, while the shell is formed of a copolymer of methylmethacrylate and butyl acrylate. The Tg of each of the core and shell depends upon the content of butyl acrylate units.
**: Comparative Sample

TABLE 2-1

| Example No. | Resistance to Protective | Plasticizer Backcoat | Scale Deposition |
|---|---|---|---|
| 1** | 0.92 | — | B |
| 2** | 0.93 | — | B |
| 3** | 0.95 | — | B |
| 4 | 1.01 | — | B |
| 5 | 1.03 | — | B |
| 6 | 1.04 | — | B |
| 7 | 1.10 | — | B |
| 8 | 1.11 | — | B |
| 9 | 1.12 | — | B |
| 10** | 1.00 | — | B |
| 11** | 1.00 | — | B |
| 12** | 1.02 | — | B |
| 13 | 1.13 | — | B |
| 14 | 1.12 | — | B |
| 15 | 1.15 | — | B |
| 16 | 1.22 | — | B |
| 17 | 1.21 | — | B |
| 18 | 1.24 | — | B |
| 19 | 1.29 | — | B |
| 20 | 1.29 | — | B |
| 21 | 1.30 | — | B |
| 22** | — | 0.95 | — |
| 23 | — | 1.00 | — |
| 24 | — | 1.09 | — |
| 25** | — | 0.99 | — |
| 26 | — | 1.11 | — |
| 27 | — | 1.23 | — |
| 28 | — | 1.30 | — |

**: Comparative Sample

TABLE 2-2

| Example No. | Resistance to Protective | Plasticizer Backcoat | Scale Deposition |
|---|---|---|---|
| 29** | 1.10 | — | B |
| 30 | 1.24 | — | B |
| 32 | 1.27 | — | B |
| 33 | 1.32 | — | A |
| 34 | 1.30 | — | B |
| 35 | 1.25 | — | A |
| 36 | 1.30 | — | A |
| 37 | 1.28 | — | B |
| 38 | 1.32 | — | A |
| 39 | 1.25 | — | A |
| 40 | — | 1.32 | — |
| Comp. 1 | 0.89 | — | C |
| Comp. 2 | — | 0.92 | — |
| Comp. 3 | 1.20 | — | C |
| Comp. 4 | — | 1.02 | — |

**: Comparative Sample

TABLE 3

| Resin No. | Tg of Core (° C.) | Tg of Shell (° C.) | Protective Colloid |
|---|---|---|---|
| 1** | 10 | 50 | anionic surfactant |
| 2** | 10 | 50 | methylcellulose |
| 3** | 10 | 50 | carboxyl-modified PVA |
| 4 | 20 | 50 | anionic surfactant |
| 5 | 20 | 50 | methylcellulose |
| 6 | 20 | 50 | carboxyl-modified PVA |
| 7 | 30 | 50 | anionic surfactant |
| 8 | 30 | 50 | methylcellulose |
| 9 | 30 | 50 | carboxyl-modified PVA |
| 10** | 10 | 100 | anionic surfactant |
| 11** | 10 | 100 | methylcellulose |
| 12** | 10 | 100 | carboxyl-modified PVA |
| 13 | 10 | 150 | anionic surfactant |
| 14 | 10 | 150 | methylcellulose |

TABLE 3-continued

| Resin No. | Tg of Core (° C.) | Tg of Shell (° C.) | Protective Colloid |
|---|---|---|---|
| 15 | 10 | 150 | carboxyl-modified PVA |
| 16 | 10 | 200 | anionic surfactant |
| 17 | 10 | 200 | methylcellulose |
| 18 | 10 | 200 | carboxyl-modified PVA |
| 19 | 20 | 200 | anionic surfactant |
| 20 | 20 | 200 | methylcellulose |
| 21 | 20 | 200 | carboxyl-modified PVA |

**: comparative core-shell resin

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be emoraced therein.

What is claimed is:

1. A thermosensitive recording medium comprising a support, a thermosensitive layer provided on said support and capable of forming a color image when heated imagewise, and a protecting layer provided on said thermosensitive layer and containing a pigment and a core-shell resin obtained by polymerizing a vinyl monomer in an emulsion containing acrylonitrile-containing polymer seeds so that a polymer of said vinyl monomer is copolymerized on each of said seeds to form a shell surrounding a core of said seed, said vinyl monomer containing acrylamide and/or methacrylamide, wherein said core-shell resin meets with the following criteria (a) and (b):

(a) the glass transition point Tg of said core is at least 20° C.; and (b) the glass transition point Tg of said shell is at least 200° C.

2. A thermosensitive recording medium as claimed in claim 1, wherein said polymerization of said vinyl monomer is performed in the presence of a protective colloid of a water-soluble resin.

3. A thermosensitive recording medium as claimed in claim 2, wherein said protective colloid is polyvinyl alcohol or a derivative thereof.

4. A thermosensitive recording medium as claimed in claim 1, wherein said core-shell resin is crosslinked.

5. A thermosensitive recording medium as claimed in claim 4, wherein said crosslinking is performed using a carbodiimide as a crossliking agent.

6. A thermosensitive recording medium as claimed in claim 1, wherein the weight ratio of said pigment to said core-shell resin is 1 or less.

7. A thermosensitive recording medium as claimed in claim 1, wherein said pigment has an average particle diameter of 3 μm or less and an oil absorbing capacity of 250 cc/100 g or less.

8. A thermosensitive recording medium as claimed in claim 1, further comprising a backcoat layer on said support, on a side of said support opposite said thermosensitive layer.

9. A thermosensitive recording medium as claimed in claim 1, further comprising an undercoat layer between said support and said thermosensitive layer.

10. A thermosensitive recording medium comprising a support, a thermosensitive layer provided on one side of said support and capable of forming a color image when heated imagewise, and a backcoat layer provided on the other side of said support and containing a pigment and a core-shell resin obtained by polymerizing a vinyl monomer in an emulsion containing acrylonitrile-containing polymer seeds so that a polymer of said vinyl monomer is copolymerized on each of said seeds to form a shell surrounding a core of said seed, said vinyl monomer containing acrylamide and/or methacrylamide, wherein said core-shell resin meets with the following criteria (a) and (b):

(a) the glass transition point Tg of said core is at least 20° C.; and (b) the glass transition point Tg of said shell is at least 200° C.

11. A thermosensitive recording medium as claimed in claim 10, wherein said shell of said polymer of said vinyl monomer has a glass transition point Tg of at least 150° C.

12. A thermosensitive recording medium as claimed in claim 10, wherein said core-shell resin is crosslinked.

13. A thermosensitive recording medium as claimed in claim 10, wherein said crosslinking is performed using a crarbodiimide as a crossliking agent.

* * * * *